US010757936B2

(12) United States Patent
Cargeeg et al.

(10) Patent No.: US 10,757,936 B2
(45) Date of Patent: Sep. 1, 2020

(54) METHODS AND COMPOSITIONS CONTAINING JASMONATES OR RELATED COMPOUNDS FOR PROMOTING BIODEFENSE ACTIVITY IN PLANTS

(71) Applicant: BASF Corporation, Florham Park, NJ (US)

(72) Inventors: R. D. Piran Cargeeg, Saskatoon (CA); Kurt Seevers, Elkhorn, NE (US)

(73) Assignee: BASF CORPORATION, Florham Park, NJ (US)

(*) Notice: Subject to any disclaimer, the term of this patent is extended or adjusted under 35 U.S.C. 154(b) by 0 days.

(21) Appl. No.: 15/090,964

(22) Filed: Apr. 5, 2016

(65) Prior Publication Data

US 2016/0212995 A1 Jul. 28, 2016

Related U.S. Application Data

(63) Continuation of application No. 13/246,010, filed on Sep. 27, 2011, now abandoned.

(60) Provisional application No. 61/387,232, filed on Sep. 28, 2010.

(51) Int. Cl.
| | |
|---|---|
| *A01N 35/06* | (2006.01) |
| *A01N 63/00* | (2020.01) |
| *A01N 63/20* | (2020.01) |
| *A01N 63/22* | (2020.01) |
| *A01N 37/42* | (2006.01) |
| *A01N 43/653* | (2006.01) |
| *A01N 51/00* | (2006.01) |
| *A01N 37/46* | (2006.01) |
| *A01N 63/10* | (2020.01) |

(52) U.S. Cl.
CPC ............ *A01N 37/42* (2013.01); *A01N 35/06* (2013.01); *A01N 37/46* (2013.01); *A01N 43/653* (2013.01); *A01N 51/00* (2013.01); *A01N 63/00* (2013.01); *A01N 63/10* (2020.01)

(58) Field of Classification Search
None
See application file for complete search history.

(56) References Cited

U.S. PATENT DOCUMENTS

| | | | | |
|---|---|---|---|---|
| 5,273,749 A * | 12/1993 | Bok | ............... | A01N 63/00 424/405 |
| 5,665,344 A | 9/1997 | Pair et al. | | |
| 6,190,652 B1 | 2/2001 | Pair et al. | | |
| 6,890,525 B2 | 4/2005 | Hick et al. | | |
| 7,176,163 B1 | 2/2007 | Takahashi | | |
| 8,025,875 B2 * | 9/2011 | Jacobsen | ............... | A01N 63/00 424/93.46 |
| 2003/0060379 A1 | 3/2003 | Souter et al. | | |
| 2004/0011101 A1 * | 1/2004 | Newton | ............... | A01N 37/06 71/23 |
| 2005/0147635 A1 * | 7/2005 | Hick | ............... | A01N 35/06 424/405 |
| 2007/0298131 A1 * | 12/2007 | Bessette | ............... | A01N 31/04 424/725 |
| 2009/0038355 A1 | 2/2009 | Marks | | |

FOREIGN PATENT DOCUMENTS

| | | |
|---|---|---|
| DE | 276025 A1 | 2/1990 |
| DE | 376025 | 2/1990 |
| JP | 2003034607 A | 2/2003 |
| WO | WO-2010/063446 | 6/2010 |
| WO | WO-2011/117272 | 9/2011 |

OTHER PUBLICATIONS

Hisabori-Wakabayashi Laboratory, "Development of new biological pesticides", <http://www.res.titech.ac.jp/~junkan/english/pesticide>, Oct. 1, 2002, p. 1-3.*
J. Kloepper, et al., "Induced Systemic Resistance and Promotion of Plant Growth by *Bacillus* spp.," Symposium: The Nature and Application of Biocontrol Microbes: *Bacillus* spp., vol. 94, No. 11, 2004, p. 1259-1266.*
Cosmic Joy, "Linalool," <http://www.cosmic-joy.com/plant_phytochemistry.htm?plantid=1039>, p. 4.
Cosmic Joy, "Nerolidol," <http://www.cosmic-joy.com/plant_phytochemistry.htm?plantid=1039>, p. 4.
Feng et al., "Effects of Exogenous Jasmonic Acid on Concentrations of Direct-Defense Chemicals and Expression of Related Genes in Bt (Bacillus thuringiensis) Corn (*Zea mays*)," *Agricultural Sciences in China*, 2007, vol. 6, No. 12, pp. 1456-1462.
Forchetti et al, "Endophytic bacteria in sunflower (*Helianthus annuus* L.): isolation, characterization, and production of jasmonates and abscisic acid in culture medium", *Applied Microbiology and Biotechnology*, Springer, Berlin, DE, Jul. 27, 2007, vol. 76, No. 5.
Hisabori-Wakabayashi Laboratory, "Development of New Biological Pesticides," <http://www.res.titech.ac.jp/-junkan/english/pesticide>, Oct. 1, 2002, pp. 1-3.
Induced Responses to Herbivory 12-46, The University of Chicago Press, Chicago, 1997.
IUPAC, "Benzyl Benzoate," <http://sitem.herts.ac.uk/aeru/iupac/1473.htm>, p. 1.
Loughrin et al., "Volatiles emitted by different cotton varieties damaged by feeding beet armyworm larvae," *Journal of Chemical Ecology*, 1995, vol. 21, pp. 1217-1227.
Reciprocal Net, "Methyl Benzoate", <http://www.reciprocalnet.org/recipnet/showsamplebasic.jsp?sampleId=27344429>, p. 1.
Rohwer et al., "Horticultural Application of Jasmonates: A Review", *Journal of Horticultural Science & Biotechnology*, 2008, vol. 83, No. 3, pp. 283-304.

* cited by examiner

*Primary Examiner* — Monica A Shin
(74) *Attorney, Agent, or Firm* — Marshall, Gerstein & Borun LLP

(57) ABSTRACT

This document relates to the use of jasmonate or related compounds in combination with crop input products (e.g., herbicides, pesticides, bioactives or biologicals, seed treatment components, semiochemicals, and the like) to induce biodefense activity in plants. Also provided are compositions comprising a jasmonate or related compound with one or more crop input product.

13 Claims, No Drawings

METHODS AND COMPOSITIONS CONTAINING JASMONATES OR RELATED COMPOUNDS FOR PROMOTING BIODEFENSE ACTIVITY IN PLANTS

CROSS-REFERENCE TO RELATED APPLICATIONS

This application is a Continuation Application of U.S. application Ser. No. 13/246,010, filed Sep. 27, 2011, the entire contents of which are hereby incorporated herein by reference. U.S. application Ser. No. 13/246,010 claims the benefit of U.S. Provisional Application No. 61/387,232, filed Sep. 28, 2010, the entire contents of which are hereby incorporated herein by reference.

TECHNICAL FIELD

This document relates to the use of jasmonates or related compounds in combination with crop input products (e.g. herbicides, pesticides, bioactives or biologicals, seed treatment components, semiochemicals, and the like) to induce biodefense activity in plants.

BACKGROUND

Jasmonic acid induces the production of plant defense proteins, such as proteinase inhibitors, and can promote insect, pathogen or viral resistance in plants by inducing the expression of plant defense genes. Jasmonic acid and methyl jasmonate, along with a number of other materials, are also discussed by Karban and Baldwin in *Induced Responses to Herbivory* 12-46 (The University of Chicago Press, Chicago, 1997).

Another material, cis-jasmone, is a volatile component of plants and its release can be induced by damage, for example during feeding on cotton by lepidopterous larvae (Loughrin et al. (1995) *J. Chem. Ecol.*, 21, 1217-1227). Compositions of cis-jasmone were found to attract adult Lepidoptera to attracticidal baits and/or field traps (U.S. Pat. No. 5,665,344). Cis-jasmone was also found to attract beneficial insects and alter gene expression in plants (U.S. Pat. No. 6,890,525).

Pesticides typically (and deliberately) have defined activity, often with few active ingredients reliant on limited and highly targeted modes of action. Such reliance provides the potential for resistance build up against important pests with globally important pesticidal groups (e.g. neonicotinoids), where any resistance could quickly place the whole chemical activity group at risk, and jeopardize sustainability of global food/feed and plant output (e.g. oil, protein, fiber) production.

SUMMARY

Provided herein are compositions and methods relating to the combination of a jasmonate or related compound and one or more crop input product.

In some embodiments, a composition comprising a jasmonate or related compound and a crop input product is provided. The jasmonate or related compound can be a jasmonate, such as methyl jasmonate or cis-jasmone. The composition can include more than one jasmonate or related compound and/or more than one crop input product. The crop input product can comprise a pesticide, fertility product, biological or bioactive, seed treatment component, semiochemical and/or an adjuvant.

In some embodiments, a method of increasing the effectiveness of a crop input product is provided. The method comprises applying a crop input product to a plant, a plant propagule, or soil, and applying a jasmonate or related compound to the plant, plant propagule (e.g., a seed), or soil in an amount effective to increase the effectiveness of the crop input product. The crop input product and the jasmonate or related compound can be applied simultaneously as individual components or as a pre-formulated or co-formulated mixture. The crop input product and the jasmonate or related compound can be formulated as a seed coating.

A method of reducing the volume of a crop input product effective to achieve a desired activity level of the crop input product is also provided. The method comprises combining the crop input product with an amount of jasmonate or related compound effective to produce a composition comprising the jasmonate or related compound and the crop input product having a reduced volume effective for providing the desired activity of the crop input product.

A method of inducing a biodefense activity in a plant is also provided. The method comprises applying a composition comprising a jasmonate or related compound and a crop input product to a plant. The method can include more than one application and/or more than one composition. The method can include application at more than one stage of plant growth. In some embodiments, the method can include application to a seed and application post-emergence.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

The various embodiments disclosed herein focus on the application of a jasmonate or related compound in combination with one or more crop input product to a plant, a plant propagule (e.g. seed, tuber, corm, root, or shoot materials), or soil. Provided herein are compositions comprising a jasmonate or related compound and a crop input product and methods for using such compositions to induce biodefense activity in plants. Jasmonates have been reported to have multifaceted activities. One or a combination of activities work in concert with the co-applied crop input product to provide complementation and/or extended activity and alternate modes of action. For pesticides, this has the potential to reduce resistance, and thereby preserve usefulness of active chemistries for extended periods.

As used herein, a jasmonate is a member of the jasmonate family of oxylipins. Jasmonate related compounds include compounds that are precursors to jasmonate production by plants, compounds that elicit jasmonate production in plants, and compounds that are jasmonate analogues. Jasmonates and related compounds include, without limitation, jasmonic acid (JA), jasmonate salts (e.g., potassium jasmonate or sodium jasmonate), jasmonic acid methyl ester ('methyl jasmonate'), jasmonic acid-L-amino acid (amide-linked) conjugates (e.g., conjugates with L-isoleucine, L-valine, L-leucine, or L-phenylalanine), 12-oxo-phytodienoic acid, coronatine, coronafacoyl-L-serine, coronafacoyl-L-threonine, methyl esters of 1-oxo-indanoyl-isoleucine, methyl esters of 1-oxo-indanoyl-leucine, coronalon (2-[(6-ethyl-1-oxo-indane-4-carbonyl)-amino]-3-methyl-pentanoic acid methyl ester), linoleic acid or derivatives thereof, or combinations of any of the above.

As used herein, a "crop input product" is a product used to increase plant health, quality, yield, or output of a desired parameter. Crop input products can be generally categorized into pesticides, fertility products, biologicals or bioactives, seed treatment components, semiochemicals, adjuvants, and the like. Thus, crop input products include, but are not limited to, fungicides, herbicides (e.g., glyphosphate (e.g. RoundUp®) and gluphosinate (e.g. Liberty® or Basta®)), insecticides, nematicides, miticides, macronutrients, micronutrients (e.g., iron, zinc, molybdenum), *Azaspirillum*, bacilli, nematodes, fungi, actinomycetes, polymers, colorants/dyes/pigments, lubricants, pheromones, synomones, (micro)floral-based signaling products, (micro)faunal based signaling products, and combinations thereof.

As used herein, the term "biodefense activity" is used to describe an activity in a plant that enhances the effectiveness of a crop input product. For example, a biodefense activity that enhances the effectiveness of an insecticide can be the production of an insecticidal toxin by a plant. A biodefense activity may or may not enhance the effectiveness of a crop input product directly. In some embodiments, a biodefense activity may enhance the effectiveness of a crop input product indirectly. For example, a biodefense activity that enhances the effectiveness of an insecticide can include an activity that induces complementary resistance to damage by other pests not controlled by the insecticide.

A jasmonate or related compound may be applied with any combination of one or more crop input product, either as a composition provided herein or as a separate application. A jasmonate or related compound can be formulated, for example, as a liquid formulation with the inclusion of a non-ionic surfactant and water. A water soluble formulation can be diluted as appropriate with water. The liquid solution can be then applied directly to the target area, or can be co-formulated as a composition provided herein. In some embodiments, a jasmonate or related compound, or a composition provided herein, can be formulated to be applied as a gas. In other embodiments, a jasmonate or related compound or a composition provided herein can be formulated as a seed additive or coating.

The compositions provided herein comprise a jasmonate or a jasmonate related compound in combination with one or more crop input product. Depending on the desired benefit, the composition can include a crop input product from one or more category of crop input products. In some embodiments, a composition provided herein includes a jasmonate or a jasmonate related compound in combination with a crop input product from more than one category. For example, a composition provided herein can contain a jasmonate or jasmonate related compound in combination with one or more pesticide and one or more fertility product. In some embodiments, more than one crop input product is included from a single category. Such an embodiment can include a jasmonate or jasmonate related compound combined with a miticide and a fungicide.

The compositions provided herein can be applied to a plant or soil by drench or by foliar application, or to a plant propagule (e.g. seed, tuber, corm, root, or shoot materials) as an additive prior to, during, or after planting. The application of a composition provided herein can be determined as appropriate for the included crop input product. For example, a composition provided herein can be applied post emergence if the crop input product contained in the composition (e.g., a fertilizer) is normally applied post emergence. In some embodiments, the compositions provided herein can be applied in multiple applications. For example, a composition comprising jasmonate and *Bacillus* can be applied as a seed treatment followed by a post-emergence application of a composition comprising jasmonate, *Bacillus*, and an herbicide such as glyphosate.

The addition of a jasmonate or related compound to a crop input product can increase the effectiveness of a crop input product by inducing biodefense activity in a plant. An increase in the effectiveness of a crop input product can be measured by any appropriate means including, without restriction, the level of pest infestation, pest infestation severity, yield, biomass, disease incidence, disease severity, and the like. The addition of a jasmonate or related compound to a crop input product can increase the effectiveness of the crop input product by at least about 2%. In some embodiments, the addition of a jasmonate or related compound to a crop input product can increase the effectiveness of a the crop input product from about 2% to about 50% (e.g., about 3%, about 4%, about 5%, about 7%, about 10%, about 12%, about 15%, about 20%, about 25%, about 30%, or about 40%). In some embodiments, the addition of a jasmonate or related compound to a crop input product can increase the effectiveness of the crop input product by more than about 50%.

In some embodiments, jasmonate or related compound can induce a biodefense activity in the absence of a crop input product. In some embodiments, the biodefensive effect of a combination of a jasmonate or related compound and a crop input product can be additive. In some embodiments, the combination or the jasmonate or related compound with a crop input product can induce a biodefense activity that increases the effectiveness of the crop input product more than what would be expected from the added benefits of the crop input product and the biodefense activity induced by the jasmonate or related compound alone. Thus, the compositions provided herein can be used in methods of increasing the effectiveness of a crop input product.

A jasmonate or related compound can be formulated as a 10 μM to about 30 mM (e.g., about 500 μM to about 2500 μM, about 1 mM to about 5 mM, or about 50 μM to about 30 mM) solution. The amount of jasmonate or related compound can be applied to seed at a rate of 1-1000 mL jasmonate or related compound solution per 100 kg of seed. For example, methyl jasmonate can be applied to canola seed at a rate of about 160 mL of a 1 mM solution per 100 kg seed. The amount of a jasmonate or related compound applied as a foliar application can be from about 1-100 g per acre (e.g., about 5-20 g/A).

Because the combination of a jasmonate or related compound with a crop input product can result in increased effectiveness of the crop input product, the compositions provided herein can be formulated to reduce the volume effective for providing the equivalent benefit of the included crop input product. For example, the combination of a jasmonate or jasmonate related compound with a crop input product can result in a composition with a volume that provides an equivalent activity to a greater volume of the crop input product alone. Such compositions can be used to reduce the amount of crop input product required to achieve the same benefit or they can be used to increase the benefit of the crop input product with the same volume. In some embodiments, a jasmonate or related compound and a crop input product can be applied separately for the same benefit. Thus the compositions provided herein can be used in methods of increasing crop input product performance with no additional handling issues.

Because the compositions provided herein can reduce the volume effective for providing the equivalent benefit of the included crop input product, the compositions can be used in methods of reducing the volume of a crop input product required to achieve the same effective activity of the crop input product. Such a method can be used to reduce handling issues with one or more crop input product. In some embodiments, jasmonate or related compound can be used to reduce the effective volume of individual crop input products used in a seed treatment to keep the overall volume below a desired threshold. For example, methyl jasmonate can be added to a combination of a fungicide (e.g., mefenoxam or fludioxonil), an insecticide (e.g., thiomethoxam), and a functional polymer to reduce the volume of the fungicide and/or the insecticide below, for example, 6-6.5 fluid ounces per hundred weight for soybean, to achieve the activity desired.

The compositions provided herein can be packaged as premixed formulations or as separate components that can be mixed prior to use. In some embodiments, the compositions provided herein can be formulated to be applied directly to plants. In other embodiments, the compositions provided herein can be formulated as a concentrate that is diluted before application. In yet other embodiments, the compositions provided herein can be produced by mixing the separate components prior to application. Packaging can further include appropriate documentation, labeling, and the like.

It is to be understood, that the methods provided herein apply to the compositions provided herein, as well as the combination of a jasmonate or related compound and a crop input product applied separately. The formulation and timing of a jasmonate or related compound applied separately from a crop input product can be appropriately adjusted to provide the same benefits as the compositions provided herein.

It is to be understood that the following examples are not intended to limit the scope of the invention.

EXAMPLES

Example 1

Effect of Methyl Jasmonate in Combination With a Pesticide and a Bioactive

Methyl jasmonate (0.02336% (w/v)) was pre-formulated with Bacillus subtilis in a water based carrier. Where appropriate, the methyl jasmonate/Bacillus composition was tank mixed with Helix XTra® (Syngenta, Greensboro, N.C.) or a fungicide package. The fungicide package was identical to Helix XTra®, though without the insecticidal component, thiamethoxam. The methyl jasmonate/Bacillus composition was applied at a rate of 160 ml/100 kg to canola seed with or without Helix XTra® (1500 ml/100 kg) or the fungicide package (1200 ml/100 kg in water to adjust to a total volume of 1500 ml/100 kg). Plots were assessed for flea beetle incidence at critical early timing periods. Table 1 indicates the complementarity of performance of the methyl jasmonate with Bacillus subtilis and Helix XTra® compared to a non-insecticidal treatment with or without methyl jasmonate (fungicide package) or Helix XTra® and Bacillus subtilis alone (site Elm Creek, Manitoba, Canada).

TABLE 1

| Treatment | Pest Incidence (%) |
|---|---|
| Fungicide package/Bacillus | 81.7 a |
| Helix XTra/Bacillus | 45.0 c |
| Fungicide package/Bacillus + Methyl Jasmonate | 60.0 b |
| Helix XTra/Bacillus + Methyl Jasmonate | 43.3 c |

Means followed by same letter do not significantly differ (P = .10, Duncan's New MRT) LSD = 8.47

Example 2

Effect of Cis-Jasmone in Combination With an Herbicide and a Bioactive

Cis-Jasmone was premixed with glyphosphate, and applied at the recommended time interval for foliar Roundup® application to corn at a rate of 10 g/A cis-jasmone and Roundup® at the labeled recommended rate. In addition, a Bacillus mixture was co-mixed with the foliar cis-jasmone/glyphosate treatment to assess combinatory activity. Table 2 shows that the combined activity of cis-jasmone with both Roundup® and Bacillus provides a significant increase in yield advantage compared to the stand-alone Roundup® treatment.

TABLE 2

| Treatment | Yield (Bu/Ac) |
|---|---|
| Roundup ® alone | 201.2 b |
| Roundup ® + Cis-jasmone | 205.2 b |
| Roundup ® + Cis-jasmone + *Bacillus* | 215.9 a |

Means followed by same letter do not significantly differ (P = .05)

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

Example 3

Effect of Methyl Jasmonate in Combination With a Pesticide and a Bioactive

A fungicidal *Bacillus subtilis* composition, Integral® (Becker Underwood, Ames, Iowa), was applied to canola seed in the presence of Helix XTra® and/or methyl jasmonate (premixed as a 1× solution with Integral® at 0.02336% (w/v)). The methyl jasmonate/Integral® composition was applied at a rate of 160 ml/100 kg to canola seed with or without Helix XTra® (1500 ml/100 kg). Where indicated, the Integral®/methyl jasmonate composition was modified to include methyl jasmonate at a concentration of 0.2× or 5×, with 1× equal to 0.02336% (w/v). Plots were assessed for flea beetle incidence and severity at critical early timing periods (days post emergence as indicated). Tables 3-5 show the effect of the application of Integral® with or without methyl jasmonate and/or Helix XTra® at various locations, as indicated.

TABLE 3

Lethbridge, Alberta, Canada

| Treatment | Pest Incidence (%) Day 8 | Pest Severity (%) Day 8 | Pest Incidence (%) Day 14 | Pest Severity (%) Day 14 |
|---|---|---|---|---|
| Integral ® alone | 54 ab | 7 ab | 100 a | 15 b |
| Integral ® + Helix XTra ® | 47 bc | 5 b | 98 a | 7 c |
| Integral ® + Methyl Jasmonate + Helix Xtra ® | 38 c | 6 ab | 92 b | 8 c |
| Integral ® + Methyl Jasmonate (0.2X) | 64 a | 10 ab | 100 a | 18 a |
| Integral ® + Methyl Jasmonate (1X) | 65 a | 10 a | 100 a | 16 ab |
| Integral ® + Methyl Jasmonate (5X) | 58 ab | 8 ab | 100 a | 14 b |

Means followed by same letter do not significantly differ (P = .05, Duncan's New MRT)

TABLE 4

Vanscoy, Saskatchewan, Canada

| Treatment | Pest Incidence (%) Day 7 | Pest Severity (%) Day 7 | Pest Incidence (%) Day 14 | Pest Severity (%) Day 14 |
|---|---|---|---|---|
| Integral ® alone | 30 a | 3.9 a | 20.8 a | 7.7 a |
| Integral ® + Helix XTra ® | 15.8 bc | 1.6 cd | 8.3 b | 5.2 ab |
| Integral ® + Methyl Jasmonate Helix Xtra ® | 9.2 c | 0.9 d | 6.7 b | 2.5 b |
| Integral ® + Methyl Jasmonate (0.2X) | 28.3 a | 3.5 ab | 20 a | 6.9 a |
| Integral ® + Methyl Jasmonate (1X) | 20 ab | 2.3 bc | 13.3 ab | 6.1 a |
| Integral ® + Methyl Jasmonate (5X) | 11.7 bc | 1.3 cd | 12.5 ab | 6.3 a |

Means followed by same letter do not significantly differ (P = .05, Duncan's New MRT)

TABLE 5

Elm Creek, Manitoba, Canada

| Treatment | Pest Incidence (%) Day 7 | Pest Severity (%) Day 7 |
|---|---|---|
| Integral ® alone | 100 a | 33 a |
| Integral ® + Helix XTra ® | 99 a | 30 a |
| Integral ® + Methyl Jasmonate + Helix Xtra ® | 100 a | 23 b |
| Integral ® + Methyl Jasmonate (0.2X) | 100 a | 23 b |
| Integral ® + Methyl Jasmonate (1X) | 100 a | 17 c |
| Integral ® + Methyl Jasmonate (5X) | 98 a | 16 c |

Means followed by same letter do not significantly differ (P = .05, Duncan's New MRT)

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A composition to increase the effectiveness of *Bacillus subtilis*, the composition comprising:
    a) cis-jasmone, and
    b) *Bacillus subtilis*.

2. The composition of claim 1, further comprising a crop input product selected from one or more of a fungicide, an herbicide, an insecticide, a nematicide, and an acaricide.

3. A method of applying a composition to a plant or soil comprising:
    applying the composition to the plant or the soil by drench or by foliar application, or applying the composition to a plant propagule as an additive prior to, during, or after planting, wherein the composition comprises:
    a) cis-jasmone, and
    b) *Bacillus subtilis*.

4. A method of increasing the effectiveness of a crop input product comprising *Bacillus subtilis*, the method comprising:
    a) applying the crop input product to a plant, a plant propagule, or soil; and
    b) applying cis-jasmone to the plant, plant propagule, or soil,
    wherein the cis-jasmone is in an amount effective to increase the effectiveness of the crop input product; and
    wherein the plant, plant propagule or soil exhibits an increase in plant health, quality, or yield.

5. The method of claim 4, wherein the crop input product and cis-jasmone are applied simultaneously.

6. The method of claim 5, wherein the crop input product and cis-jasmone are applied as a mixture.

7. The method of claim 4, wherein the crop input product and cis-jasmone are applied to a plant.

8. The method of claim 4, wherein the crop input product and cis-jasmone are applied to a seed.

9. The method of claim 8, wherein the crop input product and cis-jasmone are formulated as a seed coating.

10. A method of inducing a biodefense activity in a plant comprising:
    applying a composition to a plant, a plant propagule, or soil, the composition comprising:
    a) cis-jasmone, and
    b) *Bacillus subtilis*.

11. The method of claim 10, wherein said method comprises more than one application, and wherein said more than one application comprises applying the composition at more than one stage of plant growth.

12. The method of claim 11, wherein said method comprises applying the composition to a seed and applying the composition post-emergence.

13. A method of reducing pest infestation comprising: applying a mixture to a plant, a plant propagule, or soil, the mixture comprising:
    a) cis-jasmone, and
    b) *Bacillus subtilis*.

* * * * *